US008010630B2

(12) United States Patent
Barreto et al.

(10) Patent No.: US 8,010,630 B2
(45) Date of Patent: Aug. 30, 2011

(54) LOCAL DEVICE REDIRECTION

(75) Inventors: Daniel Ernesto Barreto, San Francisco, CA (US); Jayadev Marulappa Niranjanmurthy, Karnataka (IN); Shishuang Wang, Beijing (CN); Sriranga Seetharamaiah, Karnataka (IN)

(73) Assignee: Wyse Technology Inc., San Jose, CA (US)

( * ) Notice: Subject to any disclaimer, the term of this patent is extended or adjusted under 35 U.S.C. 154(b) by 315 days.

(21) Appl. No.: 11/952,074

(22) Filed: Dec. 6, 2007

(65) Prior Publication Data

US 2009/0150550 A1 Jun. 11, 2009

(51) Int. Cl.
*G06F 15/16* (2006.01)

(52) U.S. Cl. .......................................... 709/219; 710/31
(58) Field of Classification Search .................. 709/219; 710/31, 73
See application file for complete search history.

(56) References Cited

U.S. PATENT DOCUMENTS

| 6,895,588 | B1 | 5/2005 | Ruberg | |
|---|---|---|---|---|
| 7,017,162 | B2 * | 3/2006 | Smith et al. | 719/328 |
| 7,111,106 | B2 * | 9/2006 | Ohnishi | 710/313 |
| 7,349,391 | B2 * | 3/2008 | Ben-Dor et al. | 370/392 |
| 2004/0243883 | A1 * | 12/2004 | Shankar et al. | 714/38 |
| 2004/0255276 | A1 * | 12/2004 | Rovang | 717/124 |
| 2006/0070090 | A1 | 3/2006 | Gulkis | |
| 2006/0281451 | A1 * | 12/2006 | Zur | 455/422.1 |
| 2007/0005867 | A1 | 1/2007 | Diamant | |
| 2007/0011446 | A1 | 1/2007 | Kato et al. | |
| 2007/0061477 | A1 | 3/2007 | Stoyanov et al. | |
| 2007/0198674 | A1 * | 8/2007 | Li et al. | 709/223 |
| 2008/0168118 | A1 * | 7/2008 | Hickey et al. | 709/201 |

FOREIGN PATENT DOCUMENTS

| EP | 1 043 876 | 10/2000 |
|---|---|---|
| EP | 1 681 824 | 7/2006 |

OTHER PUBLICATIONS

Ciciora, et al., "An Introduction to Teletext and ViewData With Comments on Compatibility", IEEE Transactions on Consumer Electronics, Jul. 1979, pp. 235-245, vol. CE-25, No. 3.
Harden, et al., "Teletext/ViewData LSI" IEEE Transactions on Consumer Electronics, Jul. 1979, pp. 353-358, vol. CE-25, No. 3.

(Continued)

*Primary Examiner* — Emmanuel L Moise
*Assistant Examiner* — Marie Georges Henry
(74) *Attorney, Agent, or Firm* — McDermott Will & Emery LLP

(57) ABSTRACT

A system for redirecting a local device to a remote system includes a proxy configured to communicate with a remote access module. The remote access module is configured to establish a remote access connection between a system and a remote system. The proxy is configured to receive socket connection information for establishing a socket connection between the system and the remote system. The proxy is also configured to receive, from the remote system over the socket connection, at least one device transaction designated for a virtual device local to the remote system. The virtual device may correspond with a Universal Serial Bus device locally connected to the system. A system for automatically redirecting a local device to a remote system, as well as a system for utilizing a local device of a remote system, are also provided. Methods and machine-readable media are also provided.

50 Claims, 10 Drawing Sheets

OTHER PUBLICATIONS

Hedger, et al., "Telesoftware: Home Computing Via Broadcast Teletext", IEEE Transactions on Consumer Electronics, Jul. 1979, pp. 279-287, vol. CE-25, No. 3.

Robinson, et al. "Touch-Tone Teletext a Combined Teletext-ViewData System", IEEE Transactions on Consumer Electronics, Jul. 1979, pp. 298-303, vol. CE-25, No. 3.

Wonhong Kwon et al., "Design and Implementation of Peripheral Sharing Mechanism on Pervasive Computing With Heterogeneous Environment", Software Technologies for Embedded and Ubiquitous Systems [Lecture Notes in Computer Science], May 7, 2007, pp. 537-546, Springer Berlin Heidelberg.

http://www.fabulatech.com/products.html; FabulaTech Products; 3 pages, Nov. 30, 2007.

http://www.fabulatech.com/usb-over-network.html; USB over Network; 4 pages, Nov. 30, 2007.

http://support.citrix.com/article/CTX816193; CITRIX Knowledge Center: USB Support in MetalFrame Products; Oct. 8, 2001; May 15, 2007; document ID: CTX816193: 3 pages.

http://blogs.msdn.com/ts/archive/2006/12/05/terminal-server-plug-and-play-device-redirection-framework-in-vista-and-longhorn-part-1-aspx; Termianl Services Team Blog: Terminal Server Plug and Play Device Redirection Framework in Vista and Longhorn: Part 1.; 4 pages.

* cited by examiner

LOCAL DEVICE REDIRECTION

BACKGROUND

1. Field

The subject technology relates generally to remote computing and, in particular, relates to redirecting a local device to a remote computer.

2. Background

One approach to the design and implementation of computer networks, particularly with regard to the development of client/server applications, includes designing client applications and client devices so that the majority of the heavily used resources are at a remote computing device, such as a centralized server, connected via network. These client devices generally have minimal memory, disk storage, and processor power, but are designed under the premise that most users connected to a powerful server do not need the additional processing power. With these client devices, the total cost of ownership is minimized, because of the reduced resources and because the clients can be centrally administered and updated from the server. As such, these clients are especially suited for a network which requires a significant number of workstations.

Frequently, devices connected to the server ("server-side devices") are shared amongst a large number of clients. For example, in a data entry facility or in an office environment, multiple clients may periodically use a printer device connected to a server to print documents.

Unfortunately, a device connected to a client ("client-side device") usually cannot be shared with other clients on the network, and the client is generally limited to having exclusive local access to the client-side device. Likewise, in addition to other clients on the network not having access to the client-side device, the server also will have limited, if any, access to the client-side device.

SUMMARY

In accordance with one aspect of the disclosure, a system for redirecting a local Universal Serial Bus ("USB") device to a remote system includes a proxy configured to communicate with a remote access module. The remote access module is configured to establish a remote access connection between a system and a remote system. The proxy is configured to receive, over the remote access connection, socket connection information for establishing a socket connection between the system and the remote system. The proxy is also configured to receive, from the remote system over the socket connection, at least one USB device transaction designated for a virtual USB device local to the remote system. The virtual USB device corresponds with a USB device locally connected to the system. The USB device locally connected to the system is remote to the remote system and local to the system.

According to another aspect of the present disclosure, a system for automatically redirecting a local device to a remote system includes a module configured to connect a local device to a system. The system also includes a module configured to communicate with a remote access module. The remote access module is configured to establish a remote access connection between the system and a remote system. The module is also configured to automatically initiate redirection of the local device to the remote system when the local device is connected to the system and when the remote access connection is established between the system and the remote system.

According to yet another aspect of the present disclosure, a system for utilizing a local device of a remote system includes an agent configured to communicate with a remote access module. The remote access module is configured to establish a remote access connection between a system and a remote system. The agent is further configured to receive a notification that the remote access connection is established between the system and the remote system. The agent is also configured to provide socket connection information to the remote access module to allow a local device of the remote system to be redirected to the system. The agent is yet further configured to provide, over a socket connection to the remote system, at least one device transaction designated for the local device of the remote system. The local device is remote from the system.

According to yet another aspect of the present disclosure, a method is provided for redirecting a local device to a remote system. The method includes communicating with a remote access module. The remote access module is configured to establish a remote access connection between a system and a remote system. The method also includes receiving, over the remote access connection, socket connection information for establishing a socket connection between the system and the remote system. The method further includes receiving, from the remote system over the socket connection, at least one device transaction designated for a virtual device local to the remote system. The virtual device corresponds with a device locally connected to the system. The device locally connected to the system is remote to the remote system and local to the system.

In yet another aspect of the present disclosure, a method is provided for automatically redirecting a local device to a remote system. The method includes receiving a notification that a local device is connected to a system. The method further includes communicating with a remote access module. The remote access module is configured to establish a remote access connection between the system and a remote system. The method also includes automatically initiating redirection of the local device to the remote system when the local device is connected to the system and when the remote access connection is established between the system and the remote system. After the initiation of the redirection, the local device appears as a virtual device local to the remote system.

In another aspect of the disclosure, a method is provided for utilizing a device of a remote system. The method includes communicating with a remote access module. The remote access module is configured to establish a remote access connection between a system and a remote system. The method further includes receiving a notification that the remote access connection is established between the system and the remote system. The method also includes providing socket connection information to the remote access module to allow a local device of the remote system to be redirected to the system. The method yet further includes providing, over a socket connection to the remote system, at least one device transaction designated for the local device of the remote system. The local device is remote from the system.

In yet a further aspect of the disclosure, a system for redirecting a local device to a remote system includes means for communicating with a remote access module. The remote access module is configured to establish a remote access connection between a system and a remote system. The system further includes means for receiving, over the remote access connection, socket connection information for establishing a socket connection between the system and the remote system. The system yet further includes means for receiving, from the remote system over the socket connection, at least one device transaction designated for a virtual device local to the remote system. The virtual device corresponds with a device locally connected to the system. The device locally connected to the system is remote to the remote system and local to the system.

According to another aspect of the disclosure, a system for automatically redirecting a local device to a remote system includes means for connecting a local device to a system. The system further includes means for communicating with a remote access module. The remote access module is configured to establish a remote access connection between the system and a remote system. The system yet further includes means for automatically initiating redirection of the local device to the remote system when the local device is connected to the system and when the remote access connection is established between the system and the remote system.

In another aspect of the disclosure, a system for utilizing a device of a remote system includes means for communicating with a remote access module. The remote access module is configured to establish a remote access connection between a system and a remote system. The system further includes means for receiving a notification that the remote access connection is established between the system and the remote system. The system yet further includes means for providing socket connection information to the remote access module to allow a local device of the remote system to be redirected to the system. The system also includes means for providing, over a socket connection to the remote system, at least one device transaction designated for the local device of the remote system. The local device is remote from the system.

In a further aspect of the disclosure, a machine-readable medium is encoded with instructions executable by a processor to perform a method for redirecting a local device to a remote system. The instructions include code for communicating with a remote access module. The remote access module is configured to establish a remote access connection between the system and a remote system. The instructions further include code for receiving, over the remote access connection, socket connection information for establishing a socket connection between the system and the remote system. The instructions also include code for receiving, from the remote system over the socket connection, at least one device transaction designated for a virtual device local to the remote system. The virtual device corresponds with a device locally connected to the system. The device locally connected to the system is remote to the remote system and local to the system.

In another aspect of the disclosure, a machine-readable medium is encoded with instructions executable by a processor to perform a method for automatically redirecting a local device to a remote system. The instructions include code for receiving a notification that a local device is connected to a system. The instructions further include code for communicating with a remote access module. The remote access module is configured to establish a remote access connection between the system and a remote system. The instructions yet further include code for automatically initiating redirection of the local device to the remote system when the local device is connected to the system and when the remote access connection is established between the system and the remote system.

In yet a further aspect of the disclosure, a machine-readable medium is encoded with instructions executable by a processor to perform a method for utilizing a device of a remote system. The instructions include code for communicating with a remote access module. The remote access module is configured to establish a remote access connection between the system and a remote system. The instructions further include code for receiving a notification that the remote access connection is established between the system and the remote system. The instructions yet further include code for providing socket connection information to the remote access module to allow a local device of the remote system to be redirected to the system. The instructions also include code for providing, over a socket connection to the remote system, at least one device transaction designated for the local device of the remote system. The local device is remote from the system.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
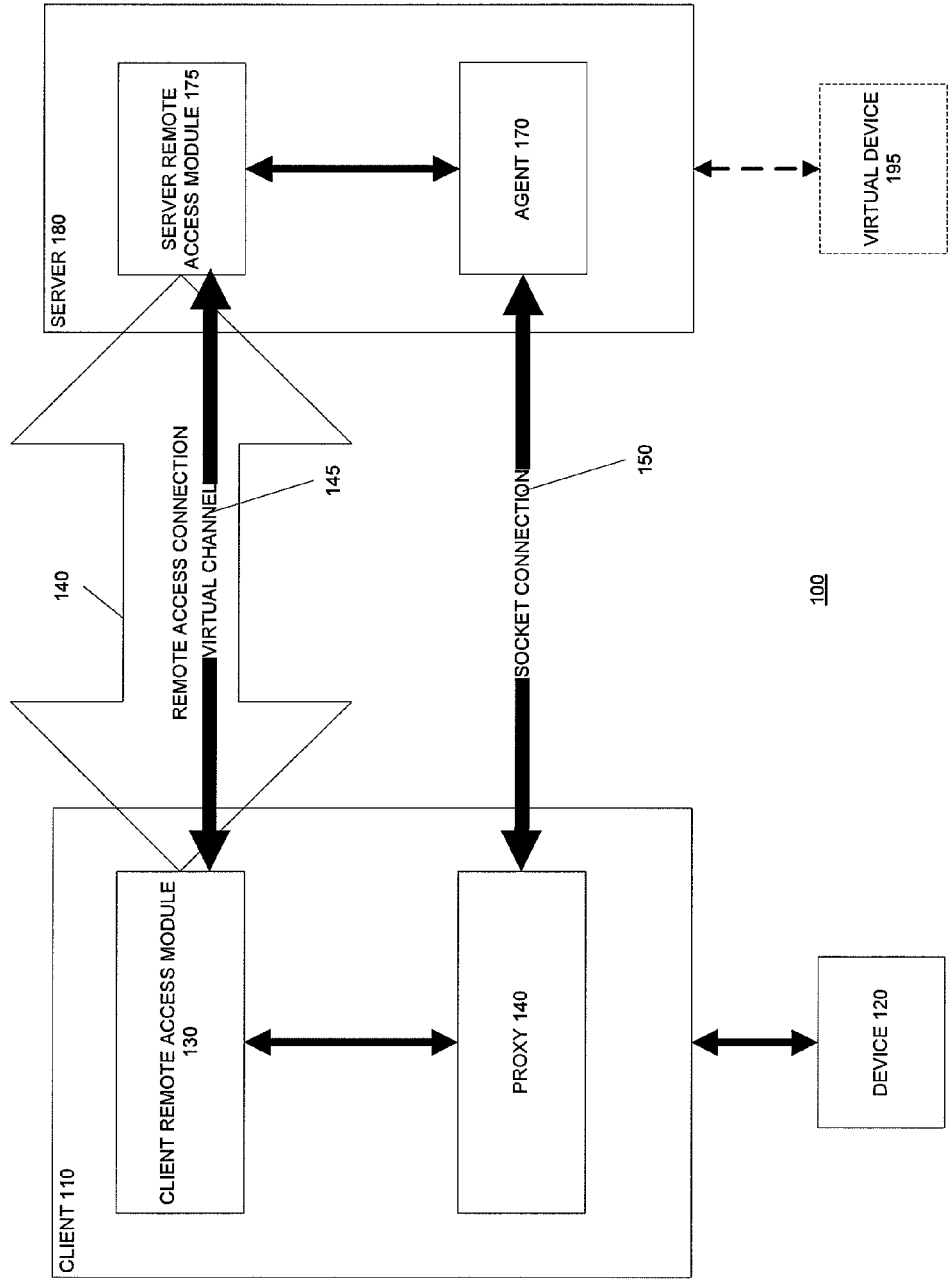
FIG. 1 is a block diagram of a local device redirection system in accordance with one configuration of the present disclosure.

Now referring to FIG. 1, a simplified diagram of a local device redirection system is illustrated in accordance with one configuration of the present disclosure. The local device redirection system 100 may include local client computing device 110 ("client") in communication with remote server computing device 180 ("server") using remote access connection 140, virtual channel 145, and socket connection 150. Client 110 may include proxy 140 and client remote access module 130. Client 110 can be connected to device 120. Server 180 may include server remote access module 175 and agent 170.

According to the illustrated configuration, while device 120 is not locally or physically connected to server 180 and is remote to server 180, device 120 appears to server 180 as if it is locally installed on and connected to server 180.

By way of illustration and not limitation, device 120 may be a machine-readable storage medium, a keyboard, a joystick, a monitor, a mouse, a camera, a scanner, a printer, a facsimile machine, a phone, a personal digital assistant (PDA), an audio player, a game console, a camcorder, an audio device, a video device, a multimedia device, a mobile pocket personal computer ("PC"), a mobile phone, a peripheral device, or other suitable devices that can be connected to client 110. Device 120 may be a stationary device or a mobile device. Device 120 may be a single interface device or a multiple interface device. Device 120 may be an external device (i.e., external to client 110). In another aspect of the present disclosure, device 120 may be an internal device (i.e., internal to client 110). For example, a keyboard, a monitor or a camera may be internal devices of client 110. Device 120 may be configured for synchronization with server 180.

In one aspect of the disclosure, device 120 is a Universal Serial Bus ("USB") device and can be locally connected to client 110 using a wired USB or wireless USB connection. In another aspect of the disclosure, device 120 may be a device other than a USB device.

Device 120 can be locally connected to client 110 using a wired communications interface including, without limitation, (i) a serial communications interface such as wired USB (discussed above), RS-232, Ethernet, or another serial communications interface, or (ii) a parallel communications interface. In another aspect of the present disclosure, device 120 may be locally connected to client 110 using a wireless communications interface, including without limitation, radio frequency ("RF"), infrared, Bluetooth®, wireless USB (discussed above), wireless fidelity (Wi-Fi), Institute for Electrical and Electronic Engineers ("IEEE") 802.11x, or the like. A wired or wireless communications interface may be coupled to proxy 140 through one or more device drivers (not shown) and/or other intermediate modules (not shown).

As used herein, a "local" device of a system, or a device "locally" connected to a system, may be a device directly connected to the system using one or more wires or connectors (e.g., physically connected to the system), a device indirectly connected to the system using one or more hubs, or a device directly connected to the system using a wireless link. For example, device 120 is a local device of client 110. Furthermore, in one aspect of the disclosure, a local device of a system or a device locally connected to a system may include a device within the system (e.g., an internal device of client 110).

A "remote" device, or a device "remote" to a system, may be a device that is not directly connected to the system. For example, server 180 is remote to both client 110 and device 120 because server 180 is not directly connected to client 110 or device 120 but connected indirectly through network 135 (illustrated in FIG. 2), which can include, for example, a router, another server, or the Internet.

Client remote access module 130 is configured to create remote access connection 140 with server remote access module 175 on server 180. Together, client remote access module 130 and server remote access module 175 are configured to allow client 110 to access server 180 over remote access connection 140. In one aspect of the disclosure, client remote access module 130 and server remote access module 175 may be configured to allow client 110 to remotely control server 180 over remote access connection 140. In another aspect of the disclosure, client remote access module 130 and server remote access module 175 may be configured to allow graphical user interface software run remotely on server 180 to be displayed locally on client 110. Exemplary remote access applications, which include client remote access module 130 and server remote access module 175 configured to create remote access connection 140, are the Microsoft® Remote Desktop Protocol ("RDP") application and the Citrix® Independent Computing Architecture ("ICA") application. The subject technology, however, is not limited to these exemplary remote access applications.

Client remote access module 130 can include an appropriate terminal service client dynamic link library as well as other static libraries for use with a remote connection. Client remote access module 130 may include a terminal service client dynamic link library (e.g., VCClient.dll) for a remote access application such as the Microsoft® RDP application and the Citrix® ICA application. Server remote access module 175 similarly can include appropriate system service modules for use with a remote connection. Client remote access module 130 and server remote access module 175 can come pre-installed with the respective operating systems operating on client 110 and server 180. Alternatively, client remote access module 130 and server remote access module 175 can be later added or otherwise configured to operate with the respective operating systems operating on client 110 and server 180.

Client remote access module 130 (e.g., VCClient.dll) can create virtual channel 145, use at least a portion of remote access connection 140 for virtual channel 145 and wait for server 180 to send socket connection information. Server remote access module 175 can receive socket connection information from agent 170 and send the socket connection information to client remote access module 130 (e.g., VCClient.dll) over virtual channel 145. Client remote access module 130 (e.g., VCClient.dll) can thus receive the socket connection information from server remote access module 175 over virtual channel 145, and upon receiving the information, client remote access module 130 (e.g., VCClient.dll) can send the socket connection information to proxy 140 to request proxy to start the local device redirection for server 180. In one aspect of the disclosure, whenever a remote access connection session is closed, client remote access module 130 (e.g., VCClient.dll) may instruct proxy 140 to stop the local device redirection to server 180.

Socket connection 150 can be configured to redirect transactions to and from device 120 between proxy 140 on client 110 and agent 170 on server 180. Redirecting transactions to and from a device is sometimes referred to as redirecting a device. In one aspect of the disclosure, redirecting a local device (e.g., device 120 local to client 110) to a remote system (e.g., server 180) allows the local device to appear as a local device (a "virtual device" 195) to the remote system even though the local device is physically remote to the remote system, and thus redirecting does not require physically moving the local device to the remote system. Redirecting a local device to a remote system allows a device transaction (e.g., a write request) directed to the virtual device (e.g., virtual device 195) to be redirected to the real local device (e.g., device 120), and a device transaction (e.g., a result of a read request) from the real local device is redirected toward the virtual device. Accordingly, a device transaction appears to be occurring with the virtual device local to the remote system, even though the device transaction is in fact occurring with the real local device.

According to one aspect of the disclosure, while socket connection 150 and remote access connection 140 may share the same physical connection (to network 135 of FIG. 2) or the same physical communication path, each of socket connection 150 and remote access connection 140 may comprise a distinct or separate communication "channel."

In one exemplary aspect of the disclosure, data packets having one type of header information may be viewed as forming one "channel." Channels may be viewed as logical entities that are differentiated by having different headers, and information sent or received over different channels may be sent or received over the same physical connection. For instance, data packets having a first header may be viewed as forming a first channel that is socket connection 150. Data packets having a second header that is different from the first header may be viewed as forming a second channel that is remote access connection 140 or virtual channel 145. For example, a first header may be "DATA," and a second header may be "CONTROL." Thus, information to be sent or received over socket connection 150 may be contained in data packets having a first header, and information to be sent or received over remote access connection 140 or virtual channel 145 may be contained in data packets having a second header that is different from the first header. The information sent or received over socket connection 150 as well as the information sent or received over remote access connection 140 or virtual channel 145 may be sent or received over the same physical connection. This is an exemplary illustration, and the subject technology is not limited to this example.

The following illustrates one exemplary usage of socket connection 150 and remote access connection 140. If device 120 is a data storage device, then read and write requests and as well the results of those requests may be sent over socket connection 150, while other requests, such as remote control requests from client 110, may be sent over remote access connection 140.

According to one aspect of the disclosure, socket connection 150 may be dedicated for device transactions related to a device (e.g., device 120). Device transactions as discussed herein may include, for example, transaction requests and results of transaction requests associated with a device. Exemplary device transactions include, without limitation, a read request, a write request, a response to a read request, a response to a write request, information being sent to write to a device, and information being read from a device. Device transactions may include other transaction requests, transaction results, and transactions associated with a device.

Virtual channel 145 may be configured to use at least a portion of remote access connection 140 to transfer socket connection information for the redirection of device 120 to server 180. For example, socket connection information for socket connection 150 is sent using virtual channel 145. Socket connection information can include, for example, the Internet protocol (IP) address information, a port number, a session identification, a cookie, or other connection information.

Proxy 140 may be configured to receive socket connection information from server 180 through client remote access module 130 (e.g., VCClient.dll), and, thereafter, initiate redirecting device transactions to and from device 120 over socket connection 150 to agent 170 on server 180.

In one aspect of the disclosure, proxy 140 may be a module or a Windows system service, and may be implemented as an executable software code (e.g., Proxy.exe). In another aspect, proxy 140 may be a module that performs a function or operation on behalf of another module—such as client remote access module 130, device 120, or one or more drivers of device 120—and communicates with agent 170 on server 180, while not disclosing the details of the function or operation to server 180, or may be a module that performs a task in the background. In yet another aspect, proxy 140 may a module that performs other functions or operations.

Agent 170 on server 180 may be configured to register with the operating system of server 180 to receive notification of an establishment of a remote access connection between client 110 and server 180. When agent 170 receives the notification, it can determine when and who has connected to server 180 and can thus determine when and from where the local device redirection is to be initiated. In response to receiving the notification, agent 170 may open socket connection 150 and send socket connection information through server remote access module 175 over virtual channel 145 to client remote access module 130 to initiate device redirection to server 180. Agent 170 may further send and receive device transactions for device 120 over socket connection 150.

In one aspect of the disclosure, agent 170 may be a module or a Windows system service, and may be implemented as an executable software code (e.g., Agent.exe). In another aspect, agent 170 may be a module that performs a function or operation on behalf of another module—such as a server operating system, a software application, or a driver on the server—and communicates with client 110, while not disclosing the details of the function or operation to client 110, or may be a module that performs a task in the background. In yet another aspect, agent 170 may be a module that performs other functions or operations.

Advantageously, a client user can experience a real personal computer ("PC") experience when client 110 is connected to server 180. When client 110 connects to server 180 through a remote access connection session, device 120 (which is local to client 110) can be redirected to server 180. Redirected device 120 can get enumerated on server 180 and can behave as if it were a device locally connected to server 180.

In addition, a user of client 110 does not need to do any additional configurations to initiate the local device redirection process. If client 110 establishes a remote access connection to server 180, and device 120 is connected to client 110, then the local device redirection can be initiated and performed automatically. Establishing the remote access connection and connecting device 120 to client 110 may occur in any order. This redirection process can be transparent to a user (e.g., a user of client 110). The user need not be involved in initiating the local device redirection. For example, once client 110 is connected to server 180 using a remote access application such as an RDP or ICA application, and a user of client 110 (i.e., a local user) plugs in a device such as a USB peripheral to client 110, then the device (a USB peripheral in this case) can be automatically redirected to server 180, and is visible to other clients, without the local user performing any other steps. For example, the local user may not need to perform any configurations, or the local user may not need to provide any input to client 110 or server 180. The redirected device can appear as if it were a local device on remote server 180 and can work seamlessly on server 180. For instance, device 120 attached to client 110 appears as a local device to server 180 and become visible to users at other clients. When a user at another client wishes to access device 120 (e.g., read information from device 120), this can be performed without the involvement of the user at client 110.

In one aspect of the disclosure, no device-specific drivers for device 120 need to be loaded or installed locally on client 110. Instead, a device-specific driver for device 120 is loaded or installed on server 180. The device-specific drive can be pre-loaded or pre-installed on server 180, or can be loaded or installed after detecting device 120. For example, when device 120 is inserted or connected to client 110, server 180 (e.g., its operating system) can detect device 120. If the device-specific driver for device 120 is already on server 180, then the server operating system can attempt to locate and load an appropriate device-specific driver based on the device information of device 120, (e.g., by searching the Internet through network 135 shown in FIG. 2). Server 180 can automatically perform these tasks (e.g., detecting device 120, searching for and loading/installing the device-specific driver). Alternatively, server 180 can prompt client 110 with a wizard such as "New Hardware Found" via remote access connection 140.

Furthermore, because device 120 connected to local client 110 appears as a local device to remote server 180, remotely controlled programs on server 180 can access device 120 as if it were a local device of server 180. For example, a user of client 110 (or a user of another client) utilizing a word processing application on server 180 through a remote access connection can print a document to device 120 (which is a printer in this case) utilizing the word processing application and the device-specific driver on server 180.

It should be noted that client 110 may install a device-specific driver for device 120 locally so that when client 110 is not connected to server (in which case the device-specific driver on server 180 is not available to client 110), client 110 can still utilize local device 120 via the local device-specific driver on client 110. When device 120 is redirected, the local device-specific driver is not utilized. Instead, the device-specific driver on server 180 is utilized.

In one aspect of the disclosure, a local device redirection system can provide when and with which system the local device redirection is to be performed, and a local device redirection system integrates the local device redirection feature with a remote access application.

Figure 2:
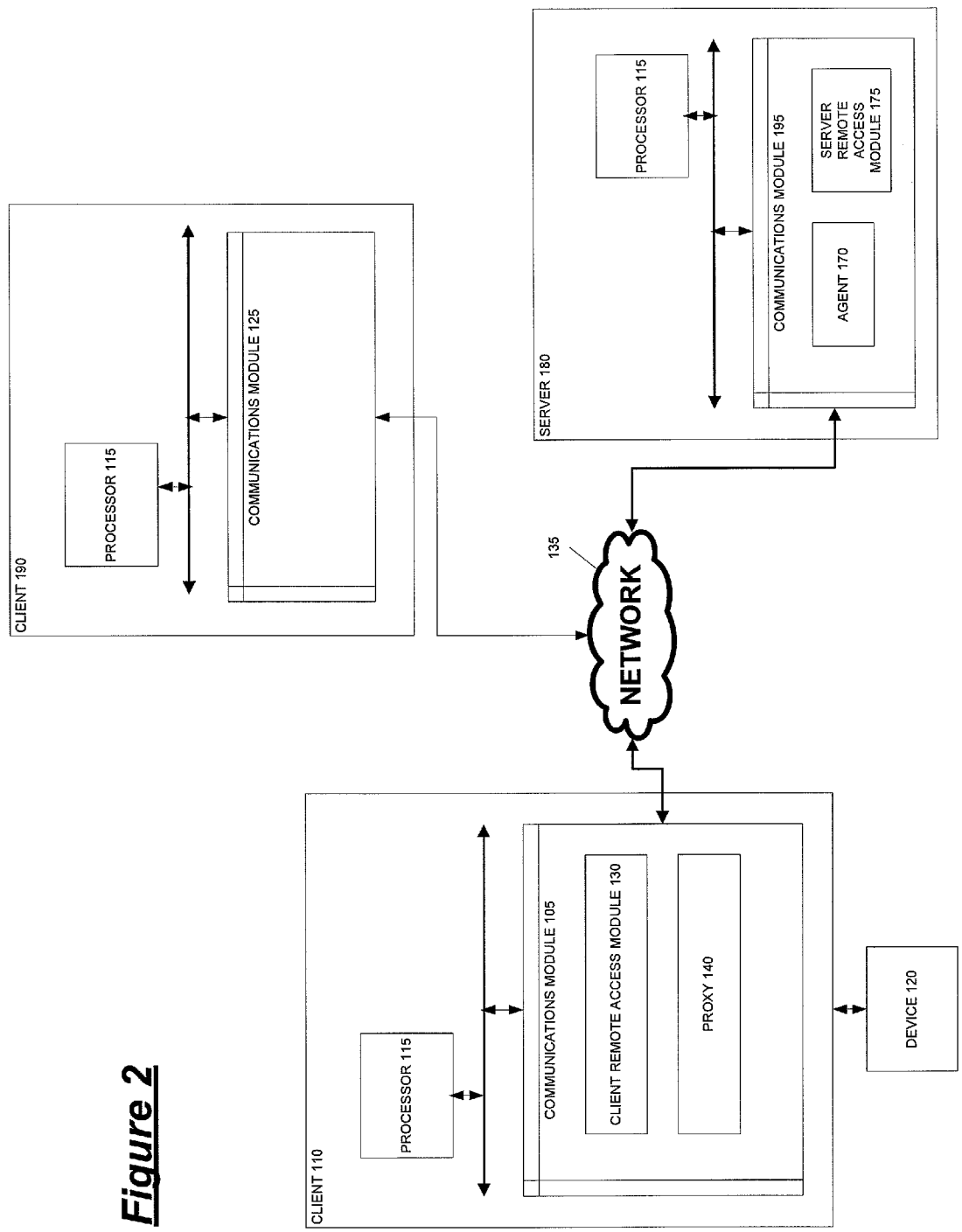
FIG. 2 is a block diagram illustrating an exemplary hardware configuration of a local device redirection system.

Now referring to FIG. 2, a conceptual block diagram is shown illustrating an exemplary hardware configuration for the local device redirection system of FIG. 1. While client 110 and server 180 correspond to the similarly named and numbered client and server of FIG. 1, client 190 of FIG. 2 is another client system which, when connected to server 180, can gain access to device 120 through server 180. For example, according to one aspect of the disclosure, client 190 can gain access to device 120 through server 180 when the operating system of server 180 is Windows 2003 Terminal Server®. A local device redirection system may include one or more clients and one or more servers. A client may include one or more devices. When device 120 is redirected to server 180, device 120 (e.g., a USB mass storage redirected) can show up, for example, in all the explorer shell across all remote access connection sessions.

Each of clients 110 and 190 can represent a computer, a laptop computer, a thin client, a PDA, a portable computing device, or a suitable device with a processor. According to one aspect of the disclosure, when a client is a thin client, it may be a device having at least a processor and memory, where the total amount of memory of the thin client is less than the total amount of memory in server 180. A thin client may not have a hard disk. In certain configurations, each of clients 110 and 190 can represent a mobile telephone, an audio player, a game console, a camera, a camcorder, an audio device, a video device, a multimedia device, or a device capable of supporting a connection to remote server 180. Clients 110 and 190 can be stationary or mobile.

Server 180 may represent a computer, a laptop computer, a thin client, a PDA, a portable computing device, a virtual machine (e.g., VMware® Virtual Machine), or a suitable device with a processor. In certain configurations, server 180 can represent a mobile telephone, an audio player, a game console, a camera, a camcorder, an audio device, a video device, a multimedia device, or another suitable device. Server 180 can be stationary or mobile.

A processor such as processor 115, illustrated as part of clients 110 and 190 and server 180, may be implemented using software, hardware, or a combination of both. By way of example and not limitation, a processor may be implemented with one or more processors. A processor may be a general-purpose microprocessor, a microcontroller, a digital signal processor ("DSP"), an application specific integrated circuit ("ASIC"), a field programmable gate array ("FPGA"), a programmable logic device ("PLD"), a controller, a state machine, gated logic, discrete hardware components, or any other suitable device that can perform calculations or other manipulations of information. A processor may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a random access memory ("RAM"), a flash memory, a read only memory ("ROM"), a programmable read-only memory ("PROM"), an erasable PROM ("EPROM"), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for a processor. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by clients 110 and 190, by server 180 or by processor 115. Instructions can be, for example, a computer program including code. A machine-readable medium may comprise one or more media.

Communications modules 105, 125, and 195, illustrated as part of clients 110 and 190 and server 180, may be implemented using software, hardware, or a combination of both. By way of example, communications modules 105, 125, and 195 may be implemented with one or communications devices, such as, but not limited to, a modem, RS-232, Ethernet, Wi-Fi, IEEE 802.11x, or other forms of communication.

Communications modules 105, 125, and 195 may also include one or more machine-readable media for storing software. Communications module 105 of client 110 includes previously described client remote access module 130 and proxy 140, each of which may have direct access to its respective processor 115. Communications module 125 of client 190 may also include one or more of client remote access module 130 and proxy 140, which may have direct access to its respective processor 115. Communications module 195 of server 180 includes previously described agent 170 and server remote access module 175, each of which may have direct access to its respective processor 115. Device 120 is connected locally to client 110, as described above.

Each of communications modules 105, 125, and 195 is also configured for communicating with the other illustrated devices over network 135. According to one aspect of the disclosure, remote access connection 140 (including virtual channel 145) and socket connection 150 may connect to network 135 using the same physical connection. In this aspect, for example, over the same physical connection to network 135, According to another aspect of the disclosure, remote access connection 140 (including virtual channel 145) and socket connection 150 may connect to network 135 using different physical connections. Communications modules 105, 125, and 195 can be connected to network 135, for example, via a modem connection, a local-area network ("LAN") connection including the Ethernet, or a broadband wide-area network ("WAN") connection including digital subscriber line ("DSL"), Cable, T1, T3, Fiber Optics, and Satellite connection. Network 135 can be a LAN network, a corporate WAN network, or the Internet, and may include features such as a firewall.

Communications modules 105, 125, and 195 may be configured to communicate information for their respective devices, clients 110, 190, and server 180. The functionality of the communications modules 105, 125, and 195 for one configuration of a local device redirection system is illustrated in FIG. 2, but those skilled in the art will readily appreciate that other configurations may include a communications module that has the same or different functionality.

Figure 3:
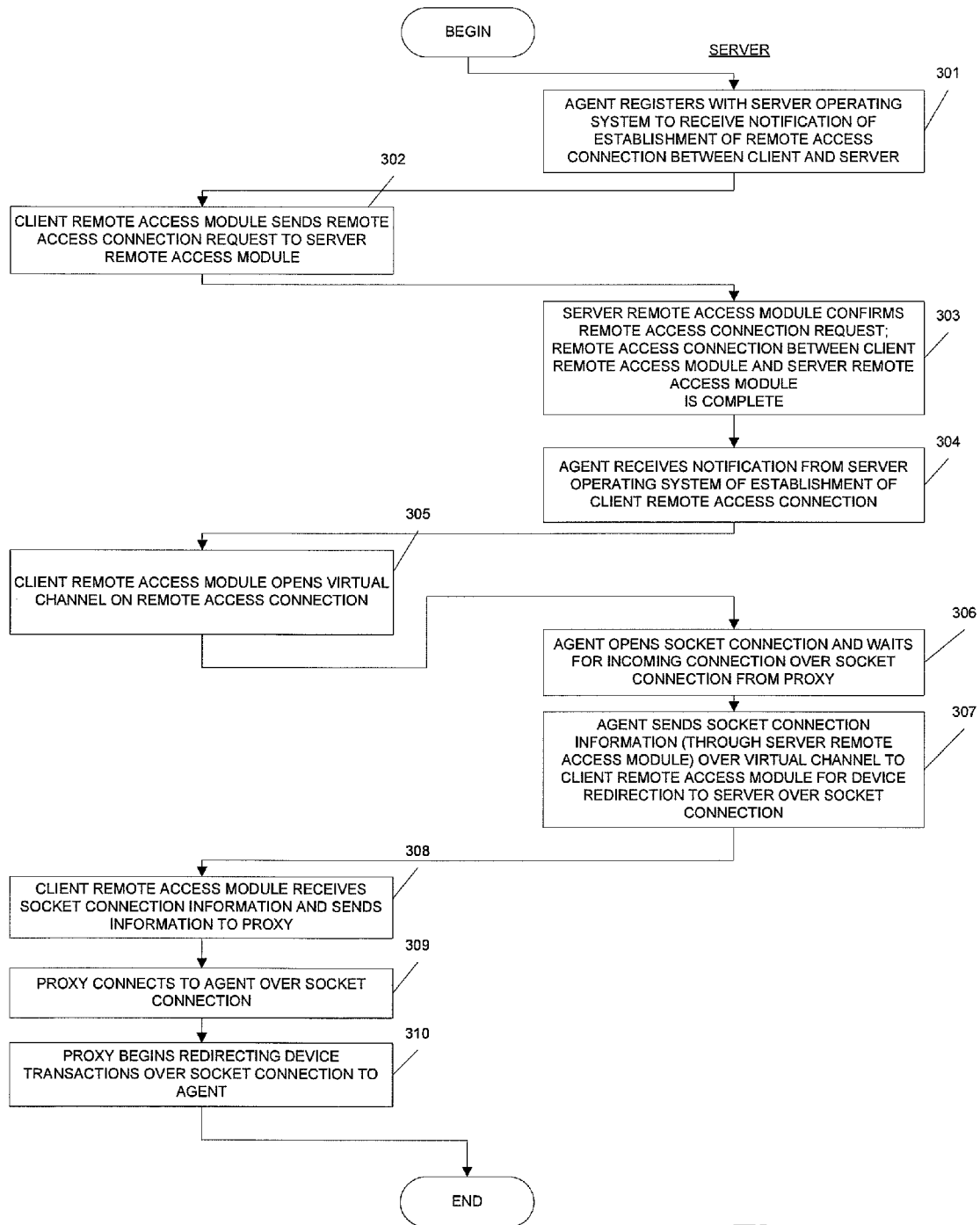
FIG. 3 is a flow chart depicting an exemplary process of redirecting a local device from a local computing device to a remote computing device.

FIG. 3 is a flowchart illustrating an exemplary method of redirecting a local device from a local computing device (e.g., client 110) to a remote computing device (e.g., server 180). The instructions for this method may be embodied in a machine-readable medium according to one aspect of the present disclosure. The method may include the following steps.

The method starts on the sever side. In step 301, agent 170 registers with the operating system of server 180 so that agent 170 can be notified whenever a remote access connection is established between client 110 and server 180.

On the client side, in step 302, client remote access module 130 sends a remote access connection request to server remote access module 175. On the server side, in step 303, server remote access module 175 confirms the remote access connection request, and the establishment of the remote access connection between client remote access module 130 and server remote access module 175 is complete. The connection can be a physical or wired connection, or the connection can be wireless, as described above. If server remote access module 175 does not confirm the request (e.g., the connect request time out period expires, or server 180 does not have the resources to complete the remote access connection), then the method ends. After the remote access connection is completed, then in step 304, agent 170 receives a notification from the server operating system that a remote access connection has been established with client 110, and the remote access connection is open.

Returning to the client side, in step 305, client remote access module 130 opens virtual channel 145 on remote access connection 140 between client remote access module 130 and server remote access module 175, for the transfer of information, such as socket connection information, for redirection of device 120.

Turning to the server side, in step 306, agent 170 opens socket connection 150 and waits for an incoming connection from proxy 140 on client 110 over socket connection 150. In step 307, agent 170 sends socket connection information to server remote access module 175, which then sends the socket connection information to client remote access module 130 over virtual channel 145 of remote access connection 140. According to one aspect of the disclosure, steps 306 and 307 may be executed concurrently or reversed in order. According to another aspect of the disclosure, steps 306 and 307 may occur before step 306.

On the client side, in step 308, client remote access module 130 receives the socket connection information from server remote access module 175 over virtual channel 145, and sends the socket connection information to proxy 140. In step 309, proxy 140 uses the socket connection information to connect to agent 170 over socket connection 150. In step 310, proxy begins redirecting device transactions from server 180 for device 120 over socket connection 150 to agent 310.

After device 120 is redirected to server 180 and thus appears as a local device to server 180 (e.g., virtual device 195), agent 170 may provide, to proxy 140 over socket connection 150, a transaction request designated for device 120 locally connected to client 110 (corresponding to virtual device 195). Proxy 140 may provide the transaction request to device 120. Proxy 140 may then receive a result of the transaction request from device 120 and send the result to agent 170 over socket connection 150. Agent 170 may provide the result to a device-specific driver (not shown) in server 180. The device-specific driver may be specific to, or compatible with, device 120.

Methods and systems for virtualization of a local device are disclosed in U.S. patent application Ser. No. 11/952,071, entitled "Local Device Virtualization" filed on Dec. 6, 2007, which is hereby incorporated by reference in its entirety. Other methods and systems known or later come to be known to those of ordinary skill in the art can also be used.

In one aspect of the disclosure, each and all of steps 303, 304, 305, 306, 307, 308, 309, and 310 may be performed automatically without the intervention of the user of client 110 and/or the intervention of the user of server 180. In another aspect, at least some of steps 303, 304, 305, 306, 307, 308, 309, and 310 may be performed automatically without the intervention of the user of client 110 and/or the intervention of the user of server 180.

Figure 4:
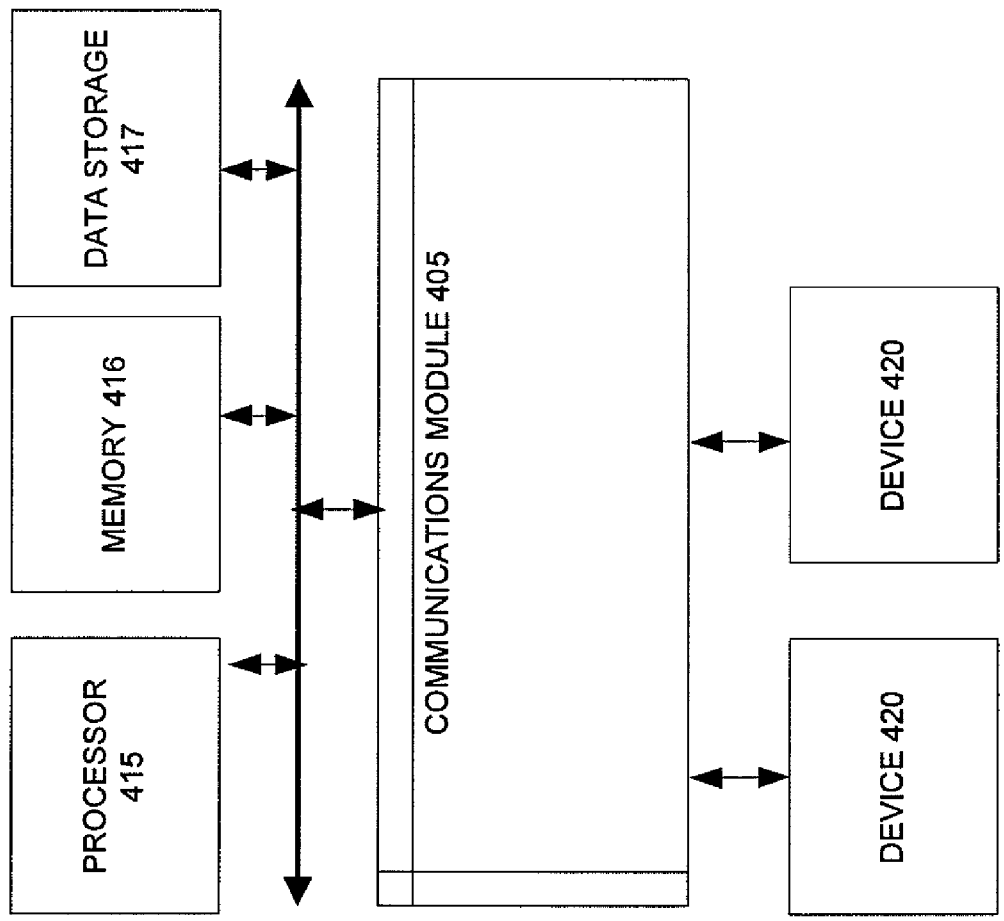
FIG. 4 is a block diagram that illustrates an exemplary computing system that can perform certain aspects of the present disclosure in accordance with one configuration of the present disclosure.

FIG. 4 is an exemplary block diagram that illustrates a computing system 400 that can perform an aspect of the present disclosure. Computing system 400 may represent any one or more of clients 110 and 190 and server 180. The computing system 400 may include communications module 405 for communicating information, bus 406 for communicating information between different modules, and processor 415 coupled with the communications module 405 for processing information. Communications module 405 may represent communications module 105, 125 or 195 (see FIG. 2). Processor 415 may represent processor 115 (see FIG. 2).

Computing system 400 may also be coupled to one device 420 or a plurality of devices 420. Devices 420 may include the same devices, similar devices, or different devices. One or more devices 420 may represent one or more devices 120 (see FIG. 2). Computing system may 400 further include memory 416, such as a RAM, a ROM or other memory device, coupled to bus 406, for storing information and instructions to be executed by processor 415. Memory 416 may also be used for storing temporary variable or other intermediate information during execution of instructions to be executed by processor 415. Computing system 400 may further include data storage device 417, such as a magnetic disk or optical disk, coupled to bus 406 for storing information and instructions. The operating system(s) as discussed herein, may reside wholly or in part, in memory 416 and/or data storage 417, and may be executed by processor 415. According to one configuration, computing system 400 functioning as a client may not have data storage 417. According to another configuration, computing system 400 functioning as a client may have data storage 417.

Now referring back to FIGS. 1 and 2, exemplary operating systems that are compatible with a local device redirection system include, but are not limited to, various versions and flavors of Windows Vista®, Windows XP®, Windows 2000 Server®, Windows Server 2003®, Windows NT®, Windows Me®, Windows 98®, Windows CE®, Windows XPe®, PocketPC®, Unix® systems, Wyse Thin Operating System ("WTOS"), and Linux®.

According to one configuration, server 180 may utilize, for example, any one of the following operating systems: a version of Windows Vista®, Windows XP® (including Windows XPe with SP2 and Windows XP Professional with SP2), Windows 2000 Server® (including Windows 2000 Server® with SP4 and Windows 2000 Advanced Server® with SP4), Windows Server 2003® (including Windows Server 2003® Standard Edition with SP1), or any other operating system. Server 180 may run any one of the following: Microsoft® Terminal Services, Citrix® Presentation server, Windows XP®, or Windows Vista®.

According to one configuration, each of clients 110 and 190 may utilize, for example, any one of the following operating systems: a version of WTOS, Linux®, Windows CE® (including Windows CE® 5.0 and Windows CE® 6.0), Windows XP®, Windows XPe®, PocketPC®, or any other operating system. Each of clients 110 and 190 may use different class thin computing platforms, such as platforms that differ in their levels of scalability, flexibility, and expense.

User experience is that of a regular PC with plug and play for each device 120. Thus, when device 120 is moved from one port of client 110 to another, a new physical device object can be created, and the user experience is the same as it would be with a regular PC. When client 110 is not connected to server 180, device 120 is not available to server 180. Clients 110 and 190 may use, for example, a Microsoft® Remote Desktop Protocol application or a Citrix® Independent Computing Architecture application to connect to server 180. In one aspect of the disclosure, no additional validations are needed for device 120. Validation can be done, for example, using a group policy object, which can detail the specific model of device 120 and the driver required for device 120. Server 180 may restrict a client or a group of clients from accessing device 120 (corresponding to virtual device 195) or other devices. Server 180 may utilize group policy objects, a standard Microsoft® utility or other utilities to prevent the access.

Both proxy 140 and agent 170 can be configured to be installed on their respective systems, client 110 and server 180, using an installation package, such as an "install shield" package commonly known in the art. According to another aspect of the disclosure, either proxy 140 or agent 170 can be configured to be installed on their respective systems as part of the operating system image that comes pre-configured with a system, or as a Windows Driver Module package for a Microsoft® Windows operating system.

A driver specific to, or compatible with, device 120 can be loaded on server 180, either before or after device 120 is connected to client 110. If server 180 does not have a driver specific to, or compatible with, device 120 (i.e., if a device-specific driver 180 for device 120 matching the device information identified by device bus driver 132 is not present) when device 120 is connected to client 110, then server 180 can present a message to a user that device 120 is not recognized by server 180. In one aspect of the disclosure, server 180 does not need additional validations to present this message. The server operating system may automatically attempt to locate and load an appropriate device-specific driver based on the device information, such as by searching the Internet through network 135. Similarly, other components, such as client remote access module 130, proxy 140, server remote access module 175, and agent 170, may already exist on their respective client and server systems, or they may be added to the systems at a later time.

Figure 5:
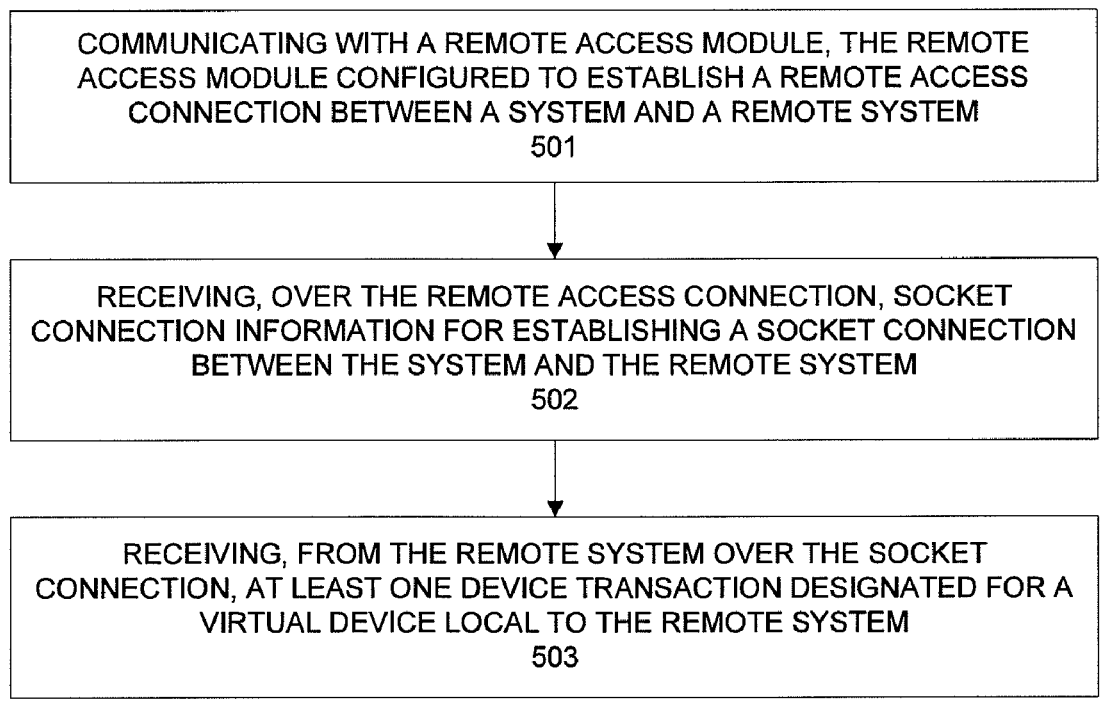
FIG. 5 is a flow chart illustrating an exemplary operation of redirecting a local device.

FIG. 5 is a flow chart illustrating an exemplary operation of redirecting a local device. A process at step 501 includes communicating with a remote access module. The remote access module is configured to establish a remote access connection between a system and a remote system. In step 502, socket connection information for establishing a socket connection between the system and the remote system is received over the remote access connection. In step 503, at least one device transaction designated for a virtual device local to the remote system is received from the remote system over the socket connection. The virtual device may correspond with a device locally connected to the system. The device locally connected to the system is remote to the remote system and local to the system. A machine-readable medium may be encoded with instructions executable by a processor to perform a method for redirection of a local device as described above.

Figure 6:
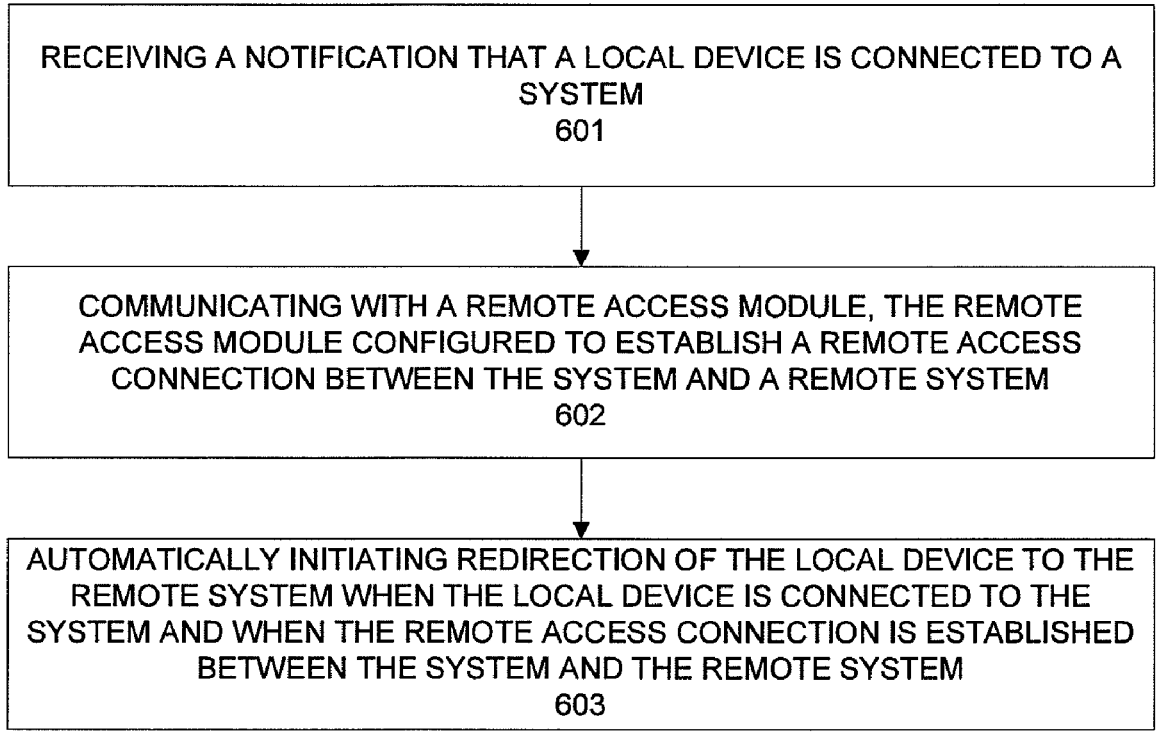
FIG. 6 is a flow chart illustrating an exemplary operation of automatically redirecting a local device.

FIG. 6 is a flow chart illustrating an exemplary operation of automatically redirecting a local device. A process at step 601 includes receiving a notification that a local device is connected to a system. A process at step 602 includes communicating with a remote access module. The remote access module is configured to establish a remote access connection between the system and a remote system. In step 603, redirection of the local device to the remote system is automatically initiated when the local device is connected to the system and when the remote access connection is established between the system and the remote system. After the initiation of the redirection, the local device may appear as a virtual device local to the remote system. A machine-readable medium may be encoded with instructions executable by a processor to perform a method for automatic redirection of a local device as described above.

Figure 7:
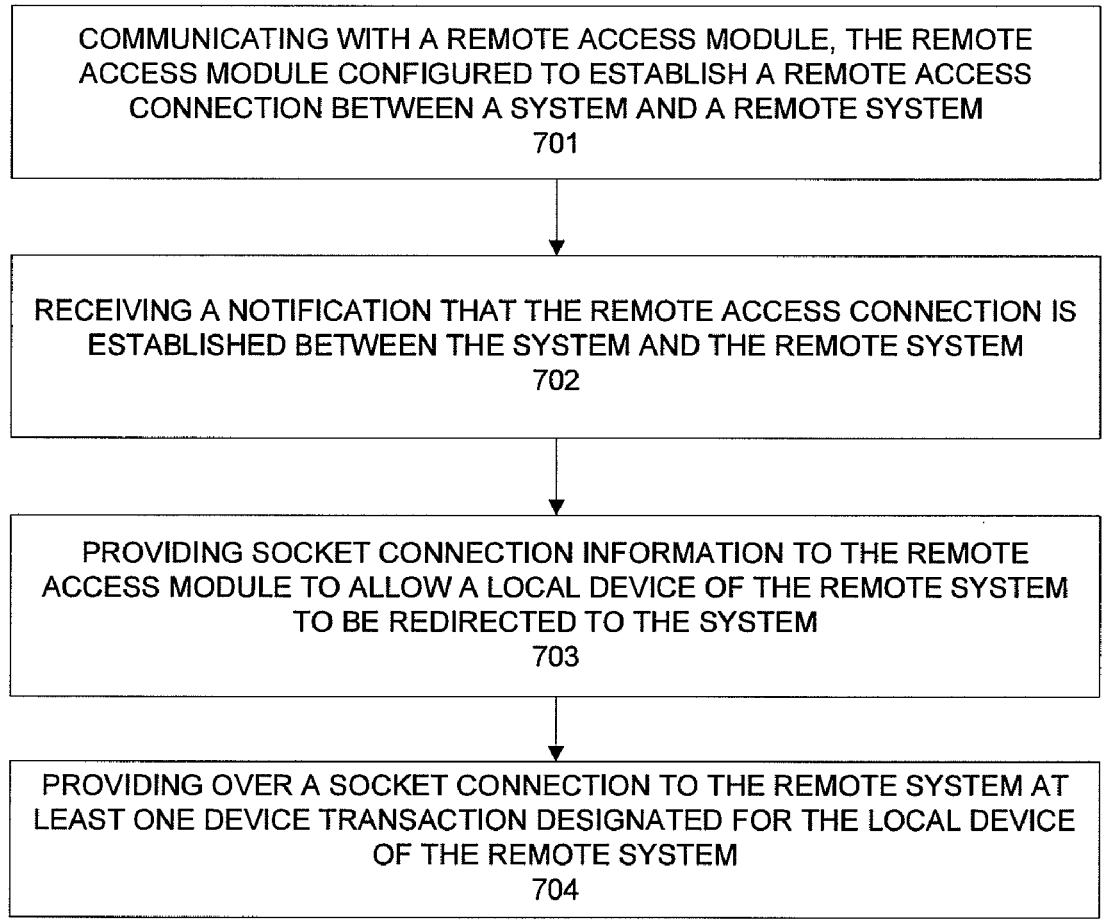
FIG. 7 is a flow chart illustrating an exemplary operation of utilizing a device of a remote system.

FIG. 7 is a flow chart illustrating an exemplary operation of utilizing a device of a remote system. A process at step 701 includes communicating with a remote access module. The remote access module is configured to establish a remote access connection between a system and a remote system. A process at step 702 includes receiving a notification that the remote access connection is established between the system and the remote system. In step 703, socket connection information is provided to the remote access module to allow a local device of the remote system to be redirected to the system. In step 704, at least one device transaction designated for the local device of the remote system is provided over a socket connection to the remote system. The local device may be remote from the system. A machine-readable medium may be encoded with instructions executable by a processor to perform a method for utilizing a device of a remote system, as described above.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Figure 8:
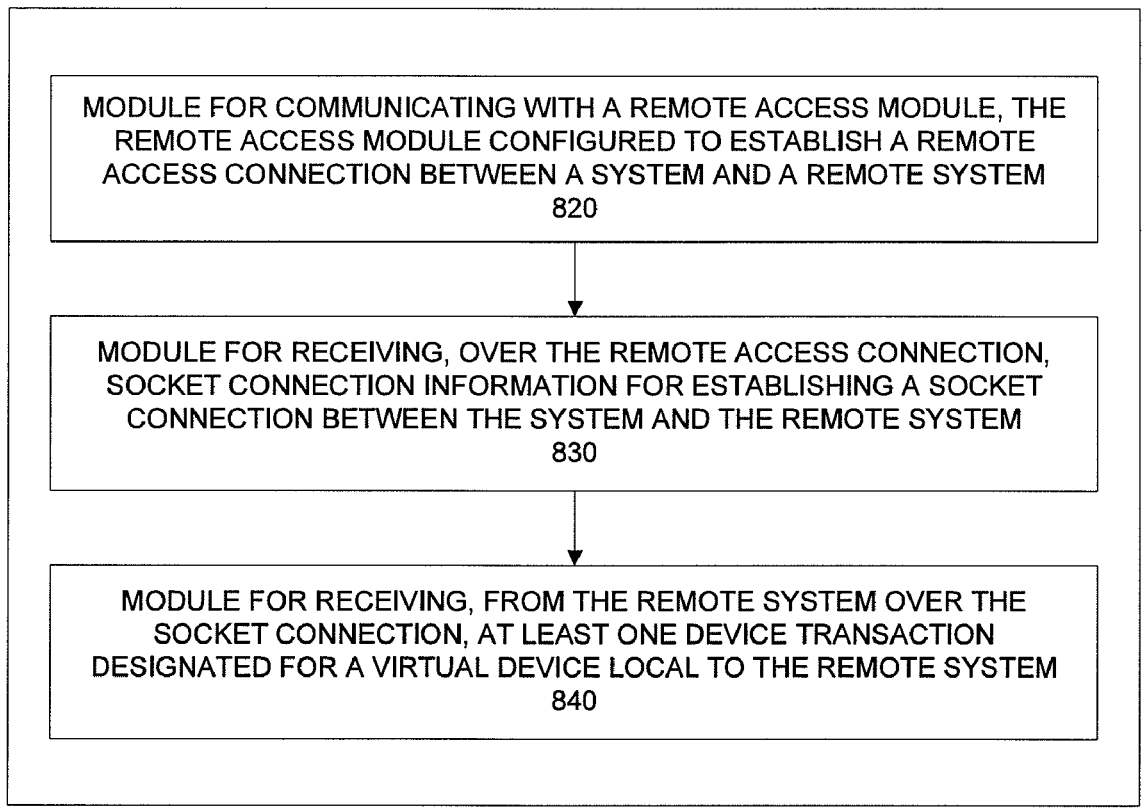
FIG. 8 is a conceptual block diagram illustrating an example of the functionality of modules in a system for redirecting a local device.

FIG. 8 is a conceptual block diagram illustrating an example of the functionality of modules in a system 810 (e.g., client 110) for redirecting a local device. In this example, system 810 includes a module 820 for communicating with a remote access module. The remote access module is configured to establish a remote access connection between a system and a remote system. System 810 further includes a module 830 for receiving, over the remote access connection, socket connection information for establishing a socket connection between the system and the remote system. System 810 also includes a module 840 for receiving, from the remote system over the socket connection, at least one device transaction designated for a virtual device local to the remote system. The virtual device may correspond with a device locally connected to the system. The device locally connected to the system is remote to the remote system and local to the system.

System 810 may include a module for automatically initiating redirection of the device to the remote system when the device is connected to the system and when the remote access connection is established between the system and the remote system. System 810 may include a module for initiating redirection of the device to the remote system without a user of the system performing configurations when the device is connected to the system and when the remote access connection is established between the system and the remote system. In system 810, module 830 can be the remote access module, and system 810 can further include a module for receiving the socket connection information from the remote access module, where the remote access module is connected over the remote access connection to a second remote access module at the remote system. The remote access connection of system 810 can include a virtual channel, and the socket connection information may be received over the virtual channel. In system 810, the socket connection information can include at least one or more of: Internet protocol (IP) address information, a port number, a session identification, and a cookie. In system 810, the system can be a computer further including a processor and the remote access module, and the remote system can be a computer including a second remote access module and an agent. In system 810, the socket connection can be distinct from the remote access connection.

Figure 9:
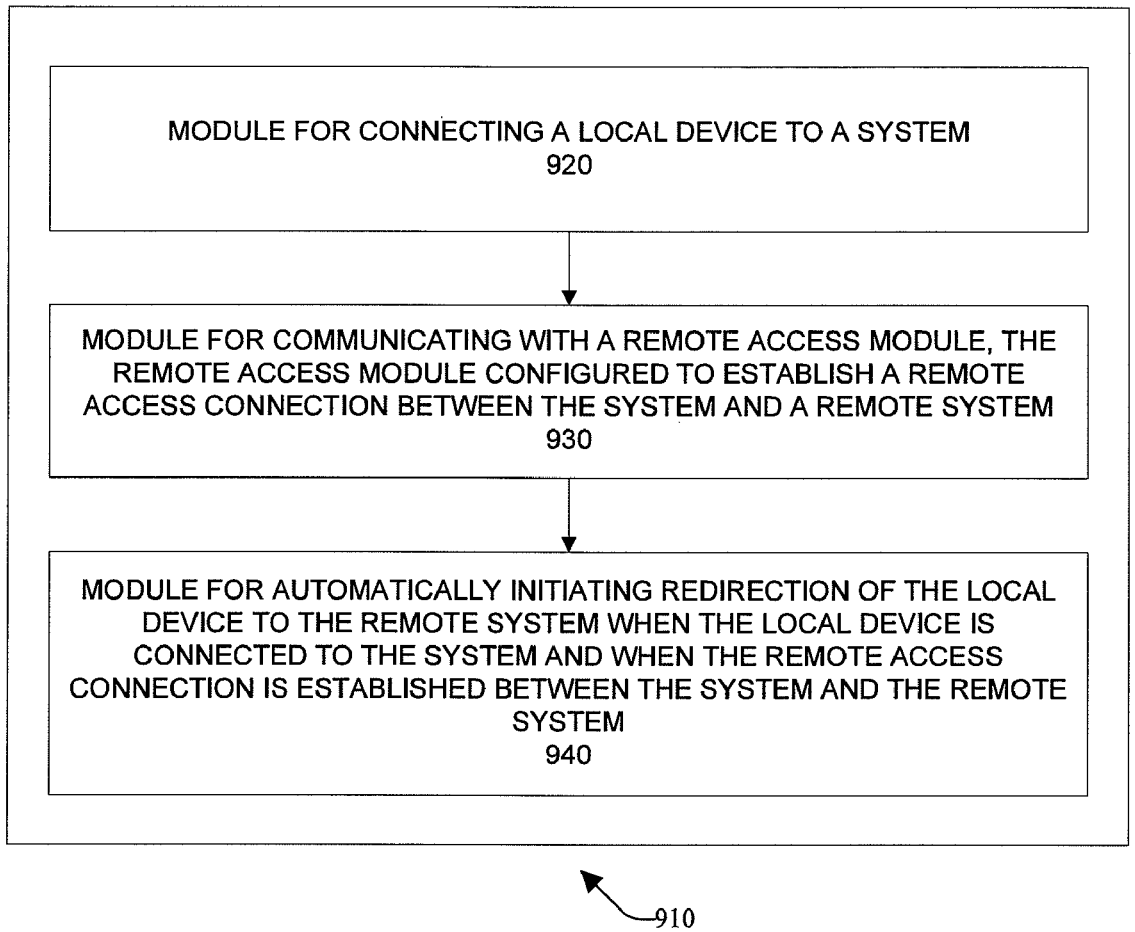
FIG. 9 is a conceptual block diagram illustrating an example of the functionality of modules in a system for automatically redirecting a local device.

FIG. 9 is a conceptual block diagram illustrating an example of the functionality of modules in a system 910 (e.g., client 110) for automatically redirecting a local device. In this example, system 910 includes a module 920 for connecting a local device to a system. System 910 also includes a module 930 for communicating with a remote access module, where the remote access module is configured to establish a remote access connection between the system and a remote system. System 910 further includes a module 940 for automatically initiating redirection of the local device to the remote system when the local device is connected to the system and when the remote access connection is established between the system and the remote system.

System 910 can further include a module for receiving, over the remote access connection, socket connection information for the redirection, where module 940 for automatically initiating redirection includes a module for automatically initiating redirection over a socket connection between the system and the remote system. In system 910, the socket connection can be distinct from the remote access connection. In system 910, module 940 for automatically initiating redirection can include a module for initiating the redirection without a user of the system providing any input to the system or the remote system when the local device is connected to the system and when the remote access connection is established between the system and the remote system. In system 910, module 930 for communicating with the remote access module can be a proxy of the system, and module 940 for automatically initiating redirection can also be the proxy of the system.

Figure 10:
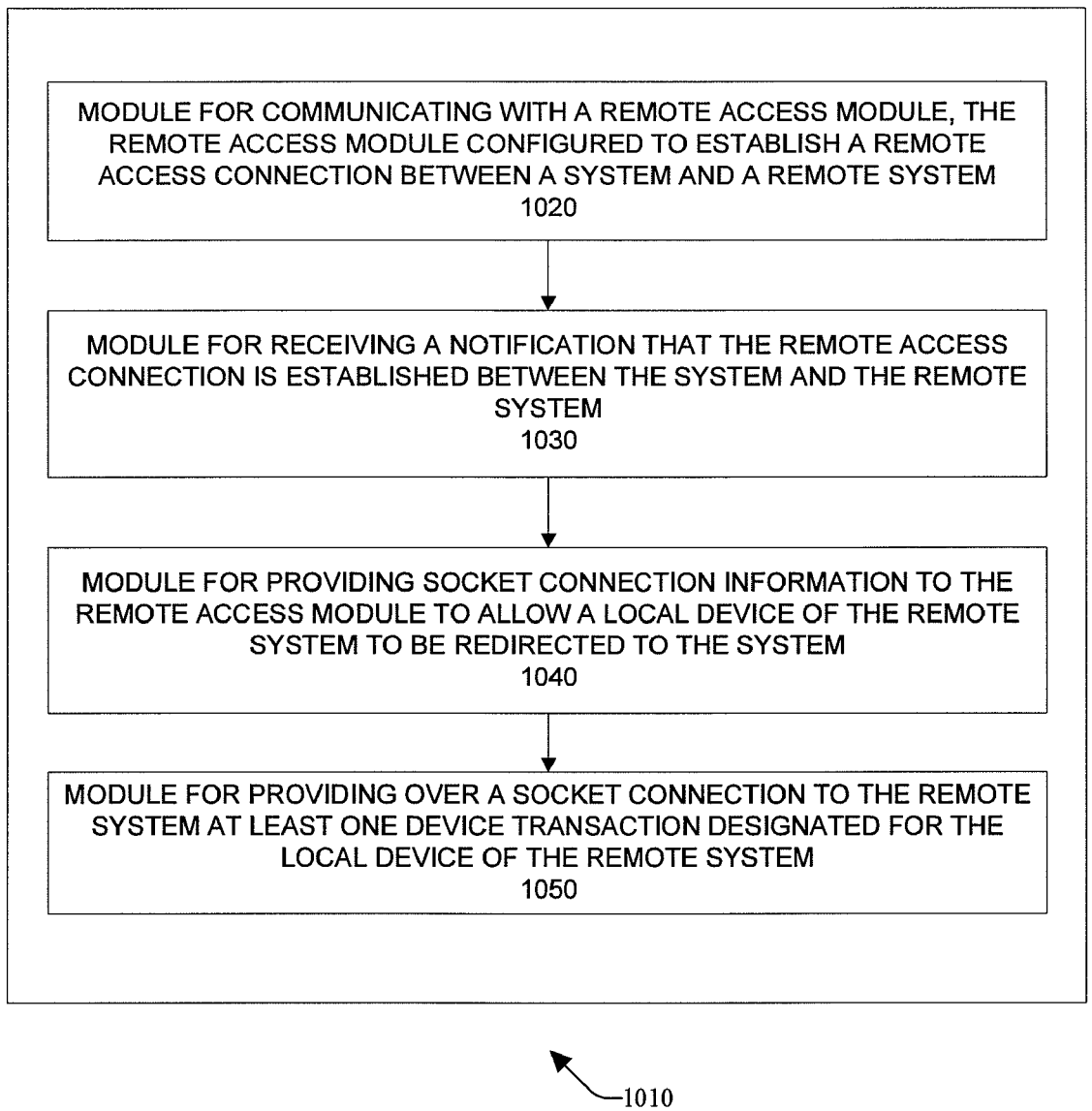
FIG. 10 is a conceptual block diagram illustrating an example of the functionality of modules in a system for utilizing a device of a remote system.
Figure 3:
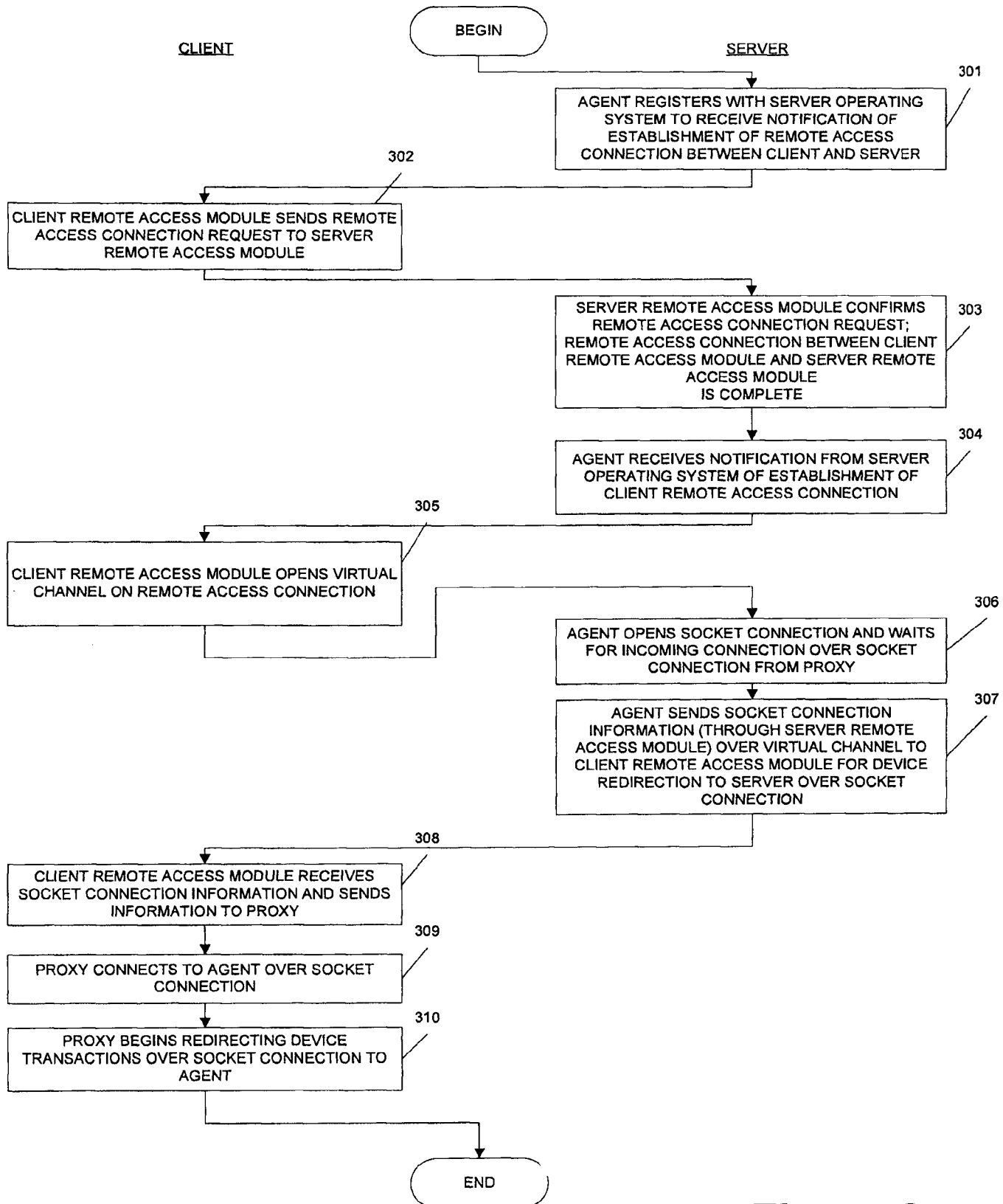

FIG. 10 is a conceptual block diagram illustrating an example of the functionality of modules in a system 1010 (e.g., server 180) for utilizing a device of a remote system (e.g., client 110). In this example, system 1010 includes a module 1020 for communicating with a remote access module, where the remote access module is configured to establish a remote access connection between a system and a remote system. System 1010 also includes a module 1030 for receiving a notification that the remote access connection is established between the system and the remote system. System 1010 further includes a module 1040 for providing socket connection information to the remote access module to allow a local device of the remote system to be redirected to the system. System 1010 also includes a module 1050 for providing over a socket connection to the remote system at least one device transaction designated for the local device of the remote system. The local device may be remote from the system.

System 1010 can further include a module for receiving, over the socket connection from a proxy on the remote system, a result of at least one device transaction request for the local device of the remote system. System 1010 can also include a module for confirming the remote access connection with a second remote access module on the remote system over the remote access connection. In system 1010, module 1030 for receiving a notification can include a module for receiving the notification from an operating system operating on the system.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

Various modules and blocks may be arranged differently (e.g., arranged in a different order, or partitioned in a different way) all without departing from the scope of the subject technology. For example, various blocks in a communications module may be implemented in one or more different modules. A communications module, a processor and a memory may be arranged differently. For instance, a proxy, an agent, a client remote access module, and a server remote access module may be stored in a memory or data storage and/or executed by a processor. A processor may include a memory. Furthermore, in one aspect of the disclosure, information such as a device transaction, a transaction request, a result of a transaction request and/or socket connection information may be encrypted. In another aspect, information may be unencrypted. It is understood that information may be received, notified or accepted from/by a module or sent, issued, notified, transmitted, reported, provided or pushed to/from a module in either encrypted or unencrypted form. Furthermore, a local device redirection system is not limited to a server-client architecture. For example, client 110 may be a server and server 180 may be a client; both client 110 and server 180 may be servers; and both client 110 and server 180 may be clients. Client 110 and server 180 may represent other architectures.

Furthermore, when information is discussed as being received, notified or accepted from/by a module or sent, issued, notified, transmitted, reported, provided or pushed to/from a module, it is understood that the information may be received, notified or accepted from/by the module or sent, issued, notified, transmitted, reported, provided or pushed to/from the module either directly or indirectly.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for redirecting a local Universal Serial Bus (USB) device to a remote system, comprising:
    a computing device comprising: a proxy configured to communicate with a remote access module, the remote access module configured to establish a remote desktop access connection between the system and the remote system, the proxy configured to receive, over the remote desktop access connection, socket connection information for establishing a socket connection between the system and the remote system, the proxy configured to receive, from the remote system over the socket connection, at least one USB device transaction request designated for a virtual USB device local to the remote system,
    wherein the virtual USB device corresponds with a USB device locally connected to the system,
    wherein the USB device locally connected to the system is remote to the remote system and local to the system,
    wherein the remote desktop access connection comprises a virtual channel,
    wherein the system is configured to receive the socket connection information over the virtual channel,
    wherein the socket connection is distinct from the remote desktop access connection,
    wherein the system is configured to facilitate sending or receiving a non-USB device transaction request to or from the remote system over the remote desktop access connection, not over the socket connection.

2. The system of claim 1, wherein the proxy is configured to automatically initiate redirection of the USB device to the remote system so that the USB device appears as the virtual USB device local to the remote system when the USB device is connected to the system and when the remote desktop access connection is established between the system and the remote system.

3. The system of claim 1, wherein the proxy is configured to initiate redirection of the USB device to the remote system so that the USB device appears as the virtual USB device local to the remote system, without a user of the system performing configurations when the USB device is connected to the system and when the remote desktop access connection is established between the system and the remote system.

4. The system of claim 1, wherein the proxy is configured to receive the socket connection information from the remote access module, the remote access module connected over the remote desktop access connection to a second remote access module at the remote system.

5. The system of claim 1, wherein the socket connection information comprises at least one or more of: Internet protocol (IP) address information, a port number, a session identification, and a cookie.

6. The system of claim 1, wherein the system is the computing device further comprising a processor and the remote access module, and wherein the remote system is a computer comprising a second remote access module and an agent.

7. The system of claim 1, wherein at least one of the at least one USB device transaction request and the socket connection information is encrypted.

8. The system of claim 1, wherein the non-USB device transaction request is a remote control request.

9. The system of claim 1, wherein the socket connection comprises a different physical connection than the remote desktop access connection.

10. The system of claim 1, wherein the system is the computing device.

11. A system for utilizing a device of a remote system, comprising:
    a computing device comprising: an agent configured to communicate with a remote access module, the remote access module configured to establish a remote desktop access connection between the system and the remote system, the agent configured to receive a notification that the remote desktop access connection is established between the system and the remote system, the agent configured to provide socket connection information to the remote access module to allow a local device of the remote system to be redirected to the system, the agent configured to provide over a socket connection to the remote system at least one device transaction request designated for the local device of the remote system,
    wherein the local device is remote from the system,
    wherein the remote desktop access connection comprises a virtual channel, wherein the system is configured to facilitate sending the socket connection information over the virtual channel, wherein the socket connection is distinct from the remote desktop access connection, wherein the system is configured to facilitate sending or receiving a transaction request that is not a device transaction request, to or from the remote system over the remote desktop access connection, not over the socket connection.

12. The system of claim 11, wherein the local device is a Universal Serial Bus (USB) device, and wherein the at least one device transaction request is a USB device transaction request.

13. The system of claim 11, wherein the agent is further configured to receive, over the socket connection from a proxy on the remote system, a result of at least one device transaction request for the local device of the remote system.

14. The system of claim 11, wherein the remote access module is configured to confirm the remote desktop access connection with a second remote access module on the remote system over the remote desktop access connection.

15. The system of claim 11, wherein the agent is configured to receive the notification from an operating system operating on the system.

16. The system of claim 11, wherein at least one of the at least one device transaction and the socket connection information is encrypted.

17. The system of claim 11, wherein the transaction request is a remote control request.

18. The system of claim 11, wherein the agent is configured to open the socket connection.

19. The system of claim 11, wherein the system is the computing device.

20. A method for redirecting a local device to a remote system, comprising:
communicating with a remote access module, the remote access module configured to establish a remote desktop access connection between a system and the remote system;
receiving, over the remote desktop access connection, socket connection information for establishing a socket connection between the system and the remote system;
receiving, from the remote system over the socket connection, at least one device transaction request designated for a virtual device local to the remote system; and
facilitating sending or receiving of, a transaction request that is not a device transaction request, to or from the remote system over the remote desktop access connection, not over the socket connection,
wherein the virtual device corresponds with a device locally connected to the system,
wherein the device locally connected to the system is remote to the remote system and local to the system,
wherein the remote desktop access connection comprises a virtual channel,
wherein the receiving, over the remote desktop access connection, socket connection information comprises receiving the socket connection information over the virtual channel,
wherein the socket connection is distinct from the remote desktop access connection.

21. The method of claim 20, wherein the device locally connected to the system is a Universal Serial Bus device.

22. The method of claim 20, further comprising:
automatically initiating redirection of the device to the remote system when the device is connected to the system and when the remote desktop access connection is established between the system and the remote system.

23. The method of claim 20, further comprising: initiating redirection of the device to the remote system without a user of the system performing configurations when the device is connected to the system and when the remote desktop access connection is established between the system and the remote system.

24. The method of claim 20, wherein the receiving socket connection information comprises receiving the socket connection information by the remote access module from the remote system, and
wherein the method further comprises:
receiving the socket connection information from the remote access module, the remote access module connected over the remote desktop access connection to a second remote access module at the remote system.

25. The method of claim 20, wherein the socket connection information comprises at least one or more of: Internet protocol (IP) address information, a port number, a session identification, and a cookie.

26. The method of claim 20, wherein the system is a computer further comprising a processor and the remote access module, and wherein the remote system is a computer comprising a second remote access module and an agent.

27. The method of claim 20, further comprising: encrypting at least one of the at least one device transaction request and the socket connection information.

28. A method for utilizing a device of a remote system, comprising:
communicating with a remote access module, the remote access module configured to establish a remote desktop access connection between a system and the remote system;
receiving a notification that the remote desktop access connection is established between the system and the remote system;
providing socket connection information to the remote access module to allow a local device of the remote system to be redirected to the system;
providing over a socket connection to the remote system at least one device transaction request designated for the local device of the remote system; and
facilitating sending or receiving of, a transaction request that is not a device transaction request, to or from the remote system over the remote desktop access connection, not over the socket connection,
wherein the local device is remote from the system,
wherein the remote desktop access connection comprises a virtual channel,
wherein the providing socket connection information comprises facilitating sending of the socket connection information over the virtual channel,
wherein the socket connection is distinct from the remote desktop access connection.

29. The method of claim 20, wherein the local device is a Universal Serial Bus device.

30. The method of claim 20, further comprising: receiving, over the socket connection from a proxy on the remote system, a result of at least one device transaction request for the local device of the remote system.

31. The method of claim 28, further comprising: confirming the remote desktop access connection with a second remote access module on the remote system over the remote desktop access connection.

32. The method of claim 28, wherein the receiving a notification comprises receiving the notification from an operating system operating on the system.

33. The method of claim 28, further comprising: encrypting at least one of the at least one device transaction request and the socket connection information.

34. A non-transitory machine-readable medium encoded with instructions executable by a processor to perform a method for redirecting a local device to a remote system, the method comprising:
communicating with a remote access module, the remote access module configured to establish a remote desktop access connection between a system and the remote system;
receiving, over the remote desktop access connection, socket connection information for establishing a socket connection between the system and the remote system;
receiving, from the remote system over the socket connection, at least one device transaction request designated for a virtual device local to the remote system; and
facilitating sending or receiving of, a transaction request that is not a device transaction request, to or from the remote system over the remote desktop access connection, not over the socket connection,
wherein the virtual device corresponds with a device locally connected to the system,
wherein the device locally connected to the system is remote to the remote system and local to the system,
wherein the remote desktop access connection comprises a virtual channel,
wherein the receiving, over the remote desktop access connection, socket connection information comprises receiving the socket connection information over the virtual channel,
wherein the socket connection is distinct from the remote desktop access connection.

35. The non-transitory machine-readable medium of claim 34, wherein the device is a Universal Serial Bus device.

36. The non-transitory machine-readable medium of claim 34, wherein the method further comprises: automatically initiating redirection of the device to the remote system when the device is connected to the system and when the remote desktop access connection is established between the system and the remote system.

37. The non-transitory machine-readable medium of claim 34, wherein the method further comprises: initiating redirection of the device to the remote system without a user of the system performing configurations when the device is connected to the system and when the remote desktop access connection is established between the system and the remote system.

38. The non-transitory machine-readable medium of claim 34, wherein the receiving socket connection information comprises receiving the socket connection information by the remote access module from the remote system, and
wherein the method further comprises:
receiving the socket connection information from the remote access module, the remote access module connected over the remote desktop access connection to a second remote access module at the remote system.

39. The non-transitory machine-readable medium of claim 34, wherein the socket connection information comprises at least one or more of: Internet protocol (IP) address information, a port number, a session identification, and a cookie.

40. The non-transitory machine-readable medium of claim 34, wherein the system is a computer further comprising a processor and the remote access module, and wherein the remote system is a computer comprising a second remote access module and an agent.

41. The non-transitory machine-readable medium of claim 34, wherein the method further comprises: encrypting at least one of the at least one device transaction request and the socket connection information.

42. The non-transitory machine-readable medium of claim 34, wherein the transaction request that is not a device transaction request is a remote control request.

43. A non-transitory machine-readable medium encoded with instructions executable by a processor to perform a method for utilizing a device of a remote system, the method comprising:
communicating with a remote access module, the remote access module configured to establish a remote desktop access connection between a system and the remote system;
receiving a notification that the remote desktop access connection is established between the system and the remote system;
providing socket connection information to the remote access module to allow a local device of the remote system to be redirected to the system;
providing over a socket connection to the remote system at least one device transaction request designated for the local device of the remote system; and
facilitating sending or receiving of, a transaction request that is not a device transaction request, to or from the remote system over the remote desktop access connection, not over the socket connection,
wherein the local device is remote from the system,
wherein the remote desktop access connection comprises a virtual channel,
wherein the providing socket connection information comprises facilitating sending of the socket connection information over the virtual channel,
wherein the socket connection is distinct from the remote desktop access connection.

44. The non-transitory machine-readable medium of claim 43, wherein the local device is a Universal Serial Bus device.

45. The non-transitory machine-readable medium of claim 43, wherein the method further comprises: receiving, over the socket connection from a proxy on the remote system, a result of at least one device transaction request for the local device of the remote system.

46. The non-transitory machine-readable medium of claim 43, wherein the method further comprises: confirming the remote desktop access connection with a second remote access module on the remote system over the remote desktop access connection.

47. The non-transitory machine-readable medium of claim 43, wherein the receiving a notification comprises receiving the notification from an operating system operating on the system.

48. The non-transitory machine-readable medium of claim 43, wherein the method further comprises: encrypting at least one of the at least one device transaction request and the socket connection information.

49. The non-transitory machine-readable medium of claim 43, wherein the method further comprises:
opening the socket connection before providing the socket connection information.

50. The non-transitory machine-readable medium of claim 43, wherein the transaction request that is not a device transaction request is a remote control request.

* * * * *

UNITED STATES PATENT AND TRADEMARK OFFICE
CERTIFICATE OF CORRECTION

| | | |
|---|---|---|
| PATENT NO. | : 8,010,630 B2 | Page 1 of 2 |
| APPLICATION NO. | : 11/952074 | |
| DATED | : August 30, 2011 | |
| INVENTOR(S) | : Daniel Ernesto Barreto et al. | |

It is certified that error appears in the above-identified patent and that said Letters Patent is hereby corrected as shown below:

Delete Drawing Sheet 3 of 10 and substitute therefore with the attached Drawing Sheet 3 of 10 consisting of FIG. 3 showing the heading --Client--.

Signed and Sealed this
Twenty-fourth Day of December, 2013

Margaret A. Focarino
*Commissioner for Patents of the United States Patent and Trademark Office*